United States Patent
Stelford et al.

(10) Patent No.: US 8,024,074 B2
(45) Date of Patent: Sep. 20, 2011

(54) SYSTEM AND METHOD OF MANAGING SUBSTANCES IN A PLANT ROOT ZONE

(75) Inventors: Mark Stelford, Hoffman Estates, IL (US); Noel W. Anderson, Fargo, ND (US); Richard Boniak, St. Charles, IL (US); Darian Landolt, Cary, IL (US)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 11/952,697

(22) Filed: Dec. 7, 2007

(65) Prior Publication Data

US 2009/0150000 A1 Jun. 11, 2009

(51) Int. Cl.
*G05D 7/00* (2006.01)
*G05B 11/00* (2006.01)

(52) U.S. Cl. ................. 700/284; 137/78.2

(58) Field of Classification Search ............ 700/284; 239/63; 703/9; 137/78.2, 78.3, 78.5, 79, 137/80, 81.1
See application file for complete search history.

(56) References Cited

U.S. PATENT DOCUMENTS

| | | | |
|---|---|---|---|
| 4,396,149 A | 8/1983 | Hirsch | |
| 4,992,942 A | 2/1991 | Bauerle et al. | |
| 5,246,164 A | 9/1993 | McCann et al. | ............ 239/11 |
| 5,870,302 A * | 2/1999 | Oliver | ............ 700/11 |
| 6,298,285 B1 | 10/2001 | Addink et al. | |
| 6,874,707 B2 | 4/2005 | Skinner | |
| 6,892,113 B1 | 5/2005 | Addink et al. | ............ 700/284 |
| 7,048,204 B1 | 5/2006 | Addink et al. | ............ 239/63 |
| 7,412,303 B1 * | 8/2008 | Porter et al. | ............ 700/284 |
| 2002/0100814 A1 | 8/2002 | Pollak et al. | ............ 239/63 |
| 2003/0109964 A1 | 6/2003 | Addink et al. | ............ 700/284 |
| 2004/0181315 A1 | 9/2004 | Cardinal et al. | |
| 2005/0096224 A1 * | 5/2005 | Dawkins | ............ 504/100 |
| 2005/0246102 A1 * | 11/2005 | Patwardhan et al. | ............ 702/2 |
| 2006/0030990 A1 | 2/2006 | Anderson et al. | |

OTHER PUBLICATIONS

Ray, D.E., Richardson, J.W., De La Torre Ugarte, D.G., Tiller, K.H. "Estimating Price Variability in Agriculture: Implications for Decision Makers". Journal of Agricultural and Applied Economics 30.1 (Jul. 1998): 21-33.*

* cited by examiner

*Primary Examiner* — Ryan Jarrett
(74) *Attorney, Agent, or Firm* — Taylor IP, PC

(57) ABSTRACT

A method for managing substances in a plant root zone, including the steps of providing a fluid distribution system, controlling the fluid distribution system, modeling the plant root zone, and distributing the substances thereto. The fluid distribution system is associated with an agricultural area. The fluid distribution system is controlled by way of a controller. The plant root zone is modeled for a plurality of locations in the agricultural area. The modeling step incorporates a desired three-dimensional distribution of the substances for each of the plurality of locations for a future time period. Substances are distributed to the plurality of locations by way of the fluid distribution system under control of the controller. The controller is dependent upon the desired three-dimensional distribution and the future time.

20 Claims, 3 Drawing Sheets

SYSTEM AND METHOD OF MANAGING SUBSTANCES IN A PLANT ROOT ZONE

FIELD OF THE INVENTION

The present invention relates to an irrigation control system, and, more particularly, to a system and method for managing water and other substances in plant root zones.

BACKGROUND OF THE INVENTION

Irrigation has been practiced for thousands of years and not much has changed in how it is practiced. Irrigation had been limited to water movement by gravity, animal and human power, and then later windmills and steam engines were employed to move water as those technologies developed. The development of the internal combustion engine enabled by the use of steel and large dams having been enabled by the use of concrete has provided the reservoirs and the devices to move stored water great distances to be applied to fields. These technologies also enabled deep wells and pumps to draw water up from the depths of aquifers such as the Ogallala aquifer in the south central United States. Steel pipes carry the water to the ends of the fields for furrow irrigation or above the fields for pivot irrigation. These technologies have been in place since the 1960's. Water movement under human control was supplemented by automatic control in the 1970's and 1980's which is further enabled by developments in microprocessors and sensors which can provide a signal that a measured amount of water has been delivered to a certain point in the field or that a certain amount of water had been applied to the field.

Water control has evolved into field water management in the 1990's and early 2000's. Point monitoring and control of water became distributed control thanks to the development of wired and wireless networks and global positioning systems (GPS). Field data collection, weather data collection and site specific irrigation control could be performed at different locations.

What is needed in the art is a new and cost efficient method and apparatus for managing water.

SUMMARY OF THE INVENTION

The present invention provides a fluid distribution control system that is dependent upon the need of a plant, based on a three-dimensional estimate of needs and for estimating those needs at a future time period.

The invention comprises, in one form thereof, a method for managing substances in a plant root zone, including the steps of providing a fluid distribution system, controlling the fluid distribution system, modeling the plant root zone, and distributing the substances thereto. The fluid distribution system is associated with an agricultural area. The fluid distribution system is controlled by way of a controller. The plant root zone is modeled for a plurality of locations in the agricultural area. The modeling step incorporates a desired three-dimensional distribution of the substances for each of the plurality of locations for a future time period. Substances are distributed to the plurality of locations by way of the fluid distribution system under control of the controller. The controller is dependent upon the desired three-dimensional distribution and the future time.

DETAILED DESCRIPTION OF THE INVENTION

Figure 1:
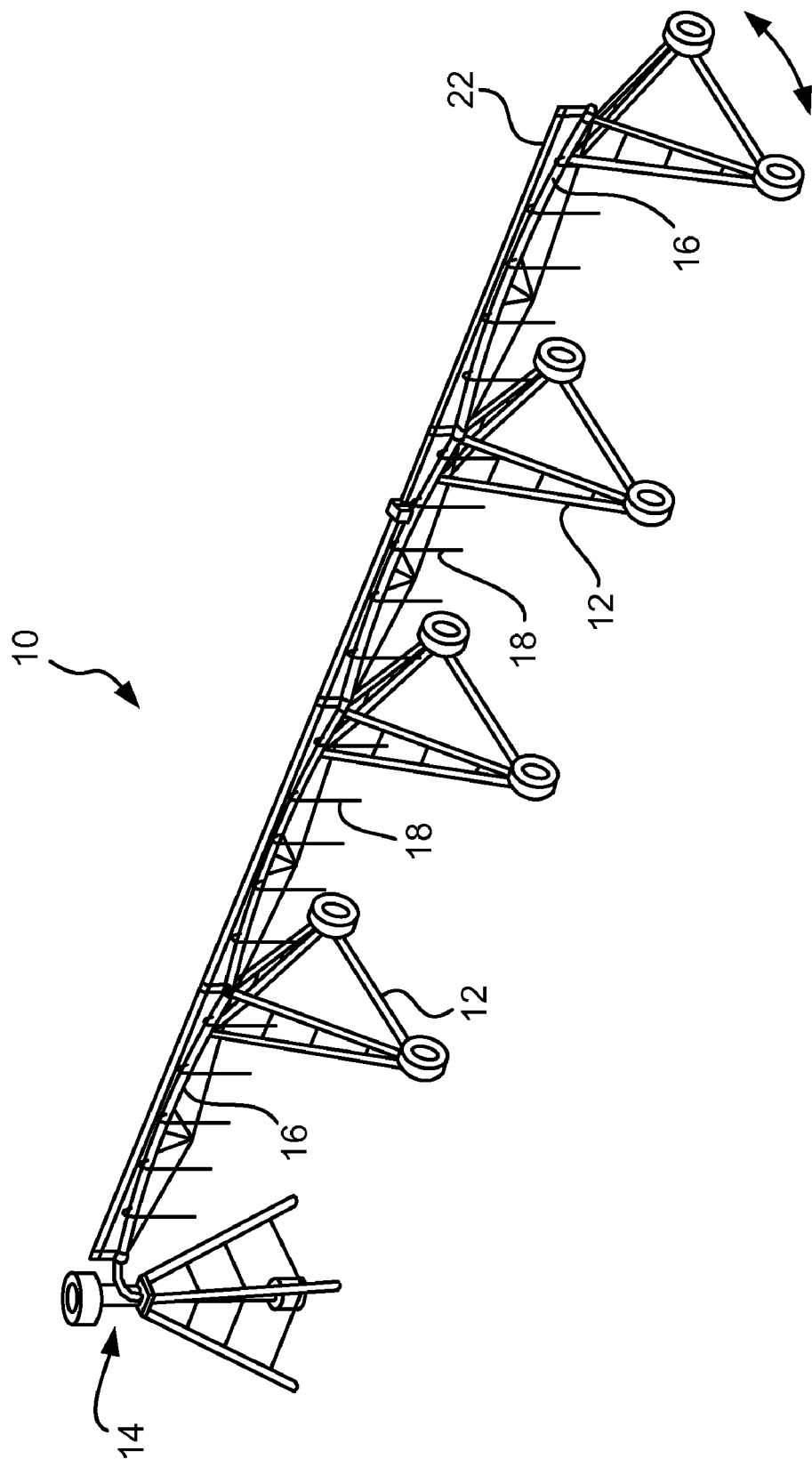
FIG. 1 is a representative irrigation system illustrated in a perspective view thereof utilizing an embodiment of the control method and apparatus of the present invention.
Figure 2:
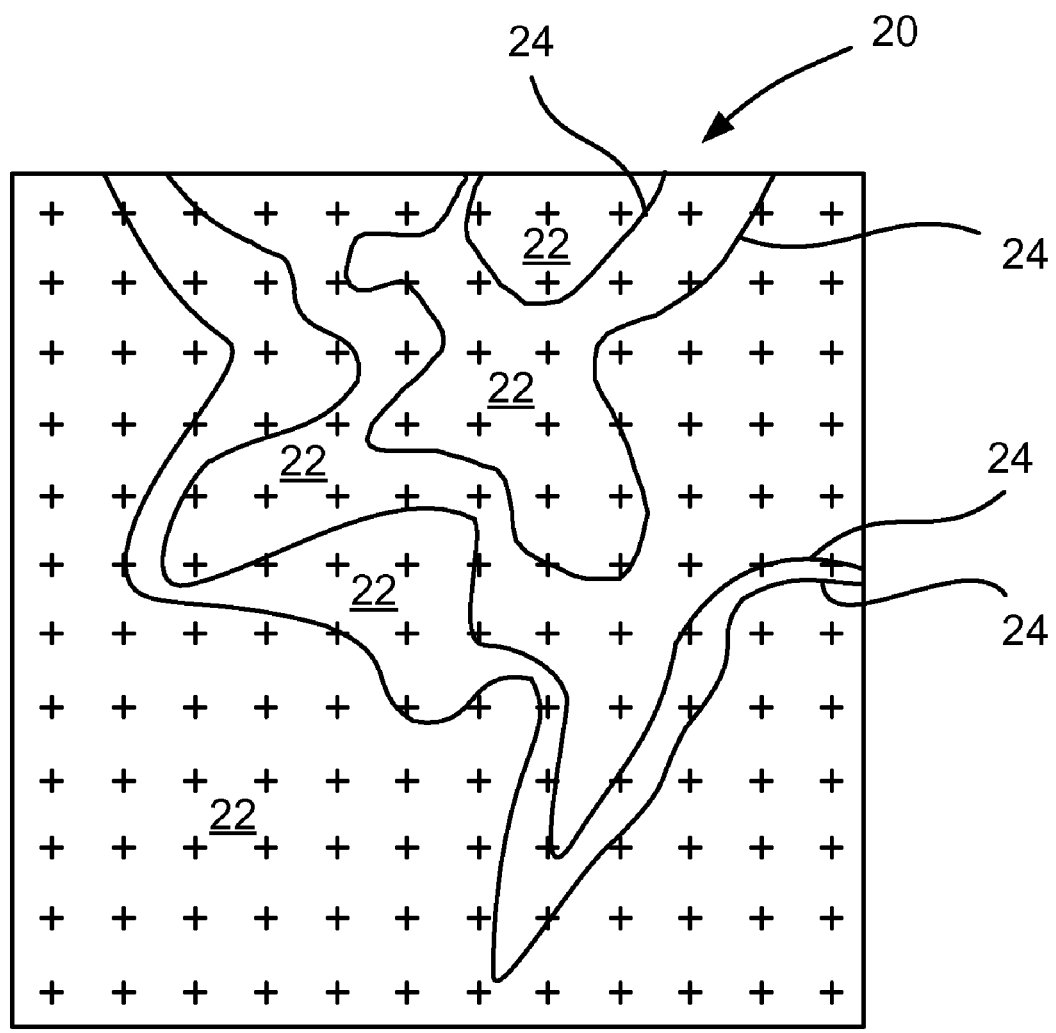
FIG. 2 illustrates an agricultural area having zones in which the irrigation system of FIG. 1 is utilized.
Figure 3:
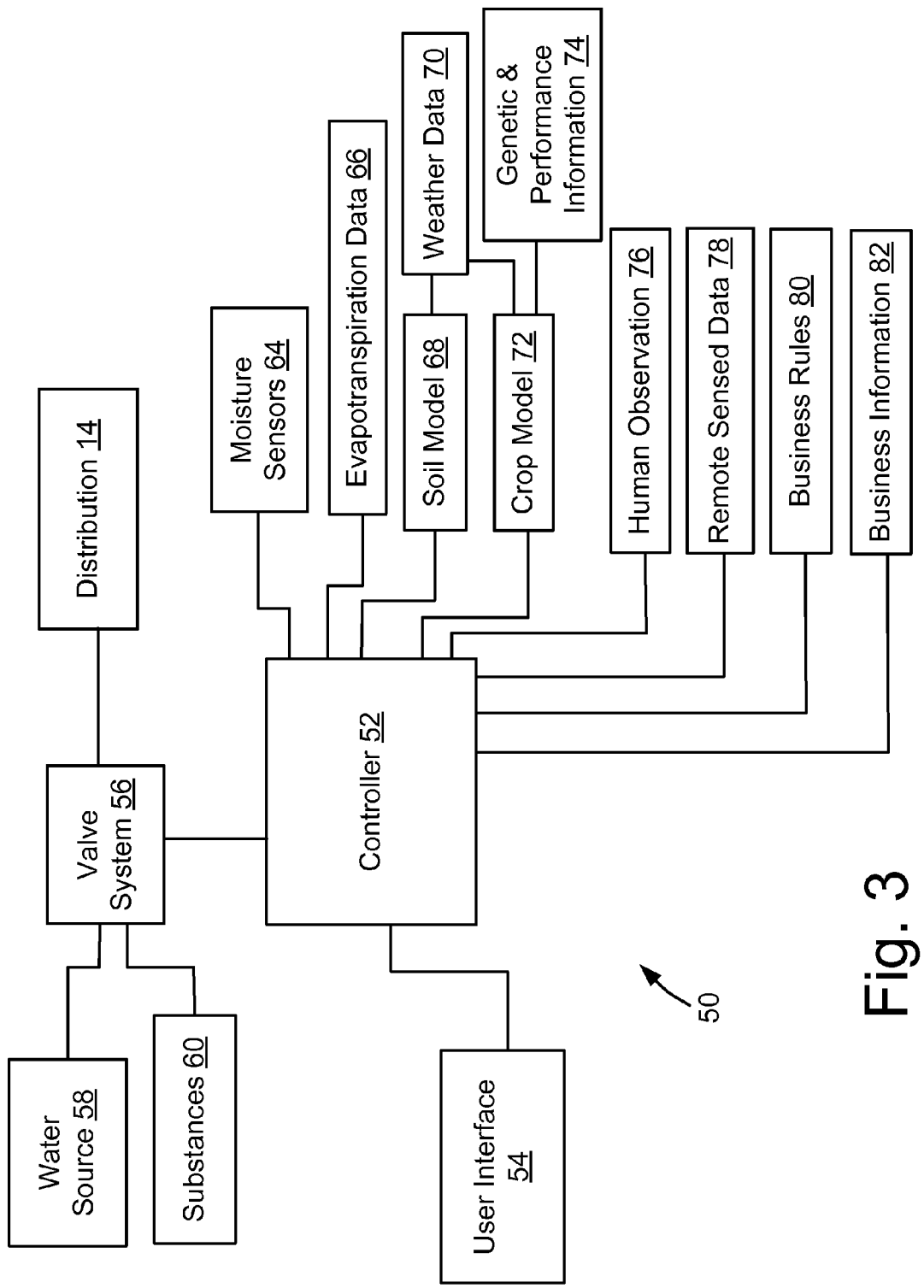
FIG. 3 is a schematic illustration of an embodiment of components of the system and informational inputs used by an embodiment of the method of the present invention.

Referring now to the drawings, and more particularly to FIGS. 1-3 there is illustrated an irrigation system 10 having a movement system 12 and a distribution system 14 including pipes 16 and nozzles 18. Although irrigation system 10 is illustrated as a pivot type of system other types of irrigation systems are also contemplated including, for example, drip tape irrigation as well as any other type. Irrigation system 10 moves across agricultural area 20 by way of movement system 12. Distribution system 14 has water and other substance delivered through pipes 16 and out nozzles 18 under the control of a controller system 50. As irrigation system 10 moves across various sub-areas 22 and crosses boundaries 24 different portions of irrigation system 10 are activated by activating individual nozzles 18 to respond to the three dimensional needs of the crops growing in agricultural area 20 in the different sub-areas 22 as irrigation system 10 moves in agricultural area 20. As a nozzle 18 crosses a boundary 24, control system 50 alters the output of that nozzle 18 to correspond to the particular need in the plant root zones of the particular sub-area.

Although sub-areas 22 have been shown having boundaries 24, the representation shown in FIG. 2 is for the ease of illustration and it is to be understood that the location of boundaries 24 may be separately established for both soil model 68 as well as crop model 72. For example, one sub-area may be used for soil model 68 that corresponds to a particular soil makeup, and a different sub-area shape may be used for crop model 72 that is based on genetic and performance information 74 for the crop. Moisture sensors 64, which may be located at some of the nodes, represented by the '+' symbol in FIG. 2, may also contribute to the definition of boundaries 24 for either crop model 72 or soil model 68 since the models are effected by the three dimensional moisture distribution. Sub-areas 22 are fluid in that they are established based on inputs received by controller 52 and result in the selection of the amount of water 58, the amount of substances 60, the duration and flow rate delivered to a particular sub-area 22 by irrigation system 10.

Control system 50 includes a controller 52, a user interface 54 and a valve system 56 that receives water from water source 58 and other substances 60 that are then sent by way of valve system 56 to distribution system 14. Substances 60 may include nutrients, herbicides, pesticides, fungicides, nematicides, salt, minerals, dyes or other fluid borne or dissolved elements or compounds. Controller 52 receives inputs from moisture sensors 64, evapotranspiration data 66, soil model 68, crop model 72, human observations 76, remote sensed data 78, business rules 80 and business information 82. Soil model 68 receives input from weather data 70 and crop model 72 receives input from genetic and performance information 74 for the particular crops being grown in agricultural area 20.

Even though different crops or crops with different genetic traits may be in agricultural area 20, for ease of understanding, agricultural area 20 will be assumed to be growing a singular crop across all sub-areas 22. Sub-areas 22 representing different two-dimensional locations within agricultural area 20. Three dimensional information and models for the different locations in agricultural area 20 provide insight into the needs of the plants in their root zones, which is utilized by controller 52 for the distribution of resources 58 and 60 to meet a need for a future time period.

The present invention controls the movement of water from water source 58 and other substances 60 through distribution system 14 with a focus on optimizing desired conditions for individual plant root zones in terms of the three-dimensional distribution of water, nutrients and other substances, such as salt. The present invention considers plant genetics, the natural environment and management options with varying outcomes and risks. It utilizes technical advances in computational hardware, crop, weather and soil modeling, water marketing, business risk assessments and global food chain management. The system and method manages substances in the plant root zones that are based upon soil models 68 for separate sub-areas 22. Soil model 68 includes a 'Z-direction' model with predicted future needs at different depths for X-Y locations of the two dimensional view of FIG. 2. Soil model 68 is correlated with crop model 72 to determine the needs of the particular crop in terms of the depth below the surface of the ground for substances 60 as well as for water 58.

Controller 52 may be a single computer, a computer with multiple processors, or a distributed processing system that is spatially distributed and networked together to work on the common task of the present method. Controller 52 can send an actuating signal to a valve system 56 that may include a number of valves controlling the flow through pipes 16 to separate individual nozzles 18 of irrigation system 10. Valve system 56 may provide a feedback signal to controller 52 to indicate the position of the valve and/or other information such as the instant or accumulative flow through the valve.

Most prior art irrigation systems have one valve for the entire area being irrigated or a number of valves, each regulating water flow for a portion of the total irrigated area. If there are multiple valves, each one may be controlled individually. Management of a prior art irrigation system is done based on sensed soil moisture from soil moisture sensors, which is compared to a target value by a processor. The difference is used to determine the position of the valve for control purposes. An alternate approaches uses evapotranspiration data to estimate a water deficit. The valve is then controlled to apply water to make up this deficit. Both of these methods suffer from the same deficiencies. One is that due to sensor cost, the spatial resolution of the control inputs, such as soil moisture or evapotranspiration, is typically poor and leads to some areas being under watered and some areas being over watered. Another weakness in the prior art is that such systems are often reactive. They take current and past data into account and maybe a short term weather forecast and then react to it. A third short fall of the prior art methods is that they do not utilize remotely sensed data such as images that indicate crop coverage of soil, crop growth stage, crop biomass, crop leaf area and crop stress due to moisture or nutrient distribution. A fourth short coming is that they do not easily incorporate ground truthing from human observations. A fifth short coming is that they are not integrated with business rules and business information, which should affect application amounts due to the cost of water and the value of the water applied to the crop. If a map is used as in some prior art systems a target volume of water or nutrient is applied to each management area. The processor in such a system uses positional information to locate a given valve and then control is undertaken so that the volume of water or nutrient is applied to that area. The present invention differs from the prior art in that the valve is controlled in a way to achieve a distribution of water, nutrients and other substances, such as salt around the plant root zone, which is a three-dimensional location at a future point in time. In the present invention the use of soil models, such as SIS, crop models, weather data, business rules, business information and even remote sensed data are utilized.

Soil model 68 and crop model 72 are supplied with other data, which can include evapotranspiration data that enables a high spatial and temporal resolution estimate of current crop water needs. This estimate is three-dimensional in the root zone and includes water availability by depth and also considers soil moisture variability arising from factors within the model including, but not limited to, soil structure, crop growth stage and business rules 80 to implement techniques such as root deficit irrigation (RDI) in which crops are intentionally water stressed for a benefit at a later crop growth stage. The soil model 68 and crop model 72 may be ground truthed by entry of human observations 76 of crop or soil conditions. Controller 52 may also use soil moisture sensors 64 for ground truthing soil model 68 and evapotranspiration data 66 to calculate the amount of water entering the atmosphere from sub-areas 22.

Business rules 80 and business information 82 enable water amounts to be adjusted based on crop value of incremental additions or subtractions of the recommended amounts of water 58 and substances 60. Crop model 72 and soil model 68 run with different irrigation water amounts and application rates such as, for example, 1 inch-acre/hour for two hours versus 2 inch-acre/hour for one hour. The crop value at harvest for a given quality of the crop is part of the business information 82. The crop value may be a single value, a function of maturity date or a complex probability distribution of value based upon crop and demand forecasts for the produced crop around the world. Models 68 and 72 are utilized along with rules 80 and information 82 to adjust water amounts so that the risk to the crop is reduced by applying more water at an earlier time to reduce a likelihood of a shortage at a critical crop growth phase in the future. Business rules 80 are also utilized by controller 52 to adjust water amounts based on alternate uses of water source 58 and/or substances 60 such as when the heat is so extreme that irrigation system 10 cannot keep up with losses and/or water source 58 and/or substances 60 may have more value being sold to other users in a market system than being consumed by irrigation system 10.

User interface 54 displays a variety of audio and visual forms and may include voice synthesis delivered to a user at a remote location to a phone or various electronic displays so that information may be reported to the user by way of user interface 54. User interface 54 may include an irrigation "dashboard" providing a summary of irrigation system 10 and the status of agricultural area 20. Information may also be received relative to unauthorized movement of sensors 64 or even the condition of sensors 64 and other elements of mechanisms contained in irrigation system 10. System 50 provides estimated past, present or future states of soil moisture in agricultural area 20 at various sub-areas 22. User interface 54 allows the user to override the recommendations of controller 52 or authorize those recommendations. User interface 54 includes authentication software to ensure that only authorized users make changes to system 50.

Advantageously the present invention provides for the computation of a three-dimensional soil model of the need for nutrients and/or water at various depths in sub-area portions of agricultural area 20. Crop model 72 incorporates genetic and performance information 74 to better define the needs of the crop including such things as salt tolerance and moisture needs at various stages of maturity of the crop. Various inputs to controller 52 provide for cross checking of information, such as remotely sensed data 78, the ground truthing by human observation 76 and/or localized moisture sensors 64 to provide levels of assurance that future needs of the plants will be properly met in the root zones of various sub-areas 22. Soil model 68 models soil types in various sub-areas 22 or even further divided areas within agricultural area 20. Soil model 68 incorporates the reactions of soil to current moisture and substances 60, rates of distribution within the soil and the need for the variable rates of distribution by distribution system 14 to the crops in order to achieve the future transportation of substances 60 with water source 58 to a proper root zone level of a particular sub-area 22. Advantageously, business rules 80 and 82 incorporate market information for the inputs into irrigation system 10 as well as the marketing value of the crop that is to be output from agricultural area 20 in order to optimize a return on investment or to reduce risk based upon future needs of the crop in agricultural area 20 as well as costs of substances 60 and water 58.

Having described the preferred embodiment, it will become apparent that various modifications can be made without departing from the scope of the invention as defined in the accompanying claims.

What is claimed is:

1. A method for managing substances in a plant root zone, comprising the steps of:
   providing a fluid distribution system associated with an agricultural area;
   controlling the fluid distribution system by way of a controller;
   modeling the plant root zone of a plurality of locations in the agricultural area, said modeling step incorporating a desired three dimensional distribution of the substances for each of said plurality of locations at a future time;
   distributing the substances to said plurality of locations by way of the fluid distribution system under control of said controller, said controller being dependent upon said desired three dimensional distribution and said future time; and
   scheduling execution of said distributing step dependent upon at least one of a rate of distribution of the substances within a root zone level and a future need for the substances at the root zone level.

2. The method of claim 1, wherein the substances include water and at least one of nutrients, salt, herbicide, fungicides, nematicides and pesticide.

3. The method of claim 2, wherein the substances are salt and water.

4. The method of claim 1, wherein said modeling step includes using a soil model, a crop model, weather data, business rules and business information.

5. The method of claim 4, wherein said modeling step additionally includes using remotely sensed data.

6. The method of claim 4, further comprising a step of estimating spatial and temporal current crop water needs using said soil model, said crop model and said weather data.

7. The method of claim 4, further comprising a step of optimizing a crop value using a probability distribution of value dependent upon global crop and demand forecasts.

8. The method of claim 4, wherein said business rules include accounting for a monetary value of water.

9. The method of claim 1, wherein said distributing step includes a step of root deficit irrigation.

10. The method of claim 1, wherein said scheduling step schedules the execution of said distributing step dependent upon said rate of distribution of the substances within the root zone level.

11. An irrigation system, comprising:
    a fluid distribution system positioned in an agricultural area, said fluid distribution system configured to deliver substances to a plant root zone in a plurality of locations in the agricultural area; and
    a controller in controlling communication with said fluid distribution system, said controller executing an algorithm that models a need for at least one substance of the substances at a selected depth in the plant root zone for said plurality of locations at a future time, said controller sending a signal to said fluid distribution system to deliver at least one of the substances to said plurality of locations in anticipation of said need for the at least one substance for said future time, said controller sending said signal dependent upon at least one of a rate of distribution of the substances within a root zone level and a future need for the substances at the root zone level.

12. The irrigation system of claim 11, wherein the substances include water and at least one of nutrients, salt, herbicide, fungicides, nematicides and pesticide.

13. The irrigation system of claim 12, wherein the substances are salt and water.

14. The irrigation system of claim 11, wherein said controller uses a soil model, a crop model, weather data, business rules and business information.

15. The irrigation system of claim 14, wherein said controller additionally uses remotely sensed data.

16. The irrigation system of claim 14, wherein said controller estimates spatial and temporal current crop water needs using said soil model, said crop model and said weather data.

17. The irrigation system of claim 14, wherein said controller optimizes a crop value using a probability distribution of value dependent upon global crop and demand forecasts.

18. The irrigation system of claim 14, wherein said business rules include accounting for a monetary value of water.

19. The irrigation system of claim 14, wherein said controller is configured to carry out root deficit irrigation based upon input from at least one of said crop model and said soil model.

20. A method for managing substances in a plant root zone, comprising the steps of:
    providing a fluid distribution system associated with an agricultural area;
    controlling the fluid distribution system by way of a controller;
    modeling the plant root zone of a plurality of locations in the agricultural area, said modeling step incorporating a desired three dimensional distribution of the substances for each of said plurality of locations at a future time;
    distributing the substances to said plurality of locations by way of the fluid distribution system under control of said controller, said controller being dependent upon said desired three dimensional distribution and said future time; and
    scheduling execution of said distributing step dependent upon a future need for the substances at the root zone level.

* * * * *